United States Patent
Bold (10) Patent No.: US 8,742,952 B1
(45) Date of Patent: Jun. 3, 2014

(54) TRAFFIC AWARENESS SYSTEMS AND METHODS

(75) Inventor: Peter Howard Bold, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 116 days.

(21) Appl. No.: 13/585,538

(22) Filed: Aug. 14, 2012

(51) Int. Cl.
*G01C 21/00* (2006.01)
*G08G 5/00* (2006.01)

(52) U.S. Cl.
CPC ............ *G08G 5/0078* (2013.01); *G08G 5/0013* (2013.01)
USPC ........... 340/980; 340/435; 340/436; 340/961; 340/968; 340/971; 701/3; 701/14; 342/65; 342/73; 342/82; 342/89

(58) Field of Classification Search
CPC ............................. G08B 5/0013; G08B 5/0078
USPC ................. 340/980, 435, 436, 961, 968, 971; 701/3, 14; 342/65, 73, 82, 89
See application file for complete search history.

(56) References Cited

U.S. PATENT DOCUMENTS

| | | | |
|---|---|---|---|
| 6,112,141 A * | 8/2000 | Briffe et al. ..................... 701/14 |
| 6,683,541 B2 | 1/2004 | Staggs et al. | |
| 7,411,519 B1 * | 8/2008 | Kuntman et al. ............. 340/968 |
| 8,160,755 B2 * | 4/2012 | Nichols et al. .................... 701/3 |

OTHER PUBLICATIONS

Hanlon, Rockwell Collins' Enhanced Vision System, www.gizmag.com/go/6720/, Jan. 10, 2007, 3 pages.
Portable Collision Avoidance System, en.wikipedia.org/wiki/Portable_Collision_Avoidance_System, retrieved Aug. 7, 2012, 3 pages.
Rockwell Collins, Head-Up Displays (HUD), www.rockwellcollins.com/Products_and_Systems/Displays.aspx, retrieved Aug. 6, 2012, 3 pages.
Rockwell Collins, Head-Up Guidance System (HGS) for Midsize and Light Business Aircraft, Apr. 2011, 12 pages.
Traffic Collision Avoidance System, en.wikipedia.org/wiki/Traffic_collision_avoidance_system, retrieved Aug. 6, 2012, 12 pages.

* cited by examiner

*Primary Examiner* — Tai T Nguyen
(74) *Attorney, Agent, or Firm* — Donna P. Suchy; Daniel M. Barbieri (57) ABSTRACT

Traffic awareness systems and methods include receiving data regarding a first aircraft and determining the location of the first aircraft relative to the location of a second aircraft. An indication of the first aircraft may be provided to a display based on a determination that the relative location of the first aircraft is within a field of view associated with the display.

20 Claims, 5 Drawing Sheets

TRAFFIC AWARENESS SYSTEMS AND METHODS

BACKGROUND

The present disclosure relates generally to traffic awareness systems and methods. More particularly, the present application relates to traffic awareness systems and methods that provide an indication of a detected aircraft to an electronic display, such as a head up display (HUD) or head down display (HDD).

Aircraft pilots rely on situational awareness to avoid collisions with hazards, such as terrain, man-made structures, weather, and other aircraft. To facilitate a pilot's awareness of potential hazards, aircraft typically are equipped with communications equipment to receive information regarding the location of potential hazards from external sources. For example, many countries have implemented air traffic control services to direct aircraft within controlled airspace and while on the ground. Air traffic control services may use ground-based radar, satellite systems, and other forms of location-determining electronics to determine the locations of aircraft within the area. An air traffic control service may use this information to perform various functions, such as approving flight plans and coordinating runway and air traffic. An air traffic control service may also provide information to an aircraft regarding other aircraft in the area, to enhance the pilot's awareness of nearby aircraft. For example, an air traffic controller may radio the approximate altitude, range, and bearing of nearby traffic to the pilot of the aircraft.

In addition to ground-based services, many modern aircraft are equipped with their own hazard detection systems. For example, an aircraft may be equipped with a radar system that makes horizontal and/or vertical radar sweeps from the aircraft to detect potential hazards. Radar returns are then analyzed by onboard processing electronics and returned to an electronic display in the aircraft's cockpit, to alert the pilot to nearby hazards. One such hazard detection system is known as a traffic collision avoidance system (TCAS). Generally, a TCAS is implemented by equipping an aircraft with a transponder that requests location information from other aircraft in the area and reports the aircraft's own information to the other aircraft. Passive TCAS are also available that do not actively request information from other aircraft. A TCAS may use the received information to predict whether a midair collision is likely and provide an alert if a potential collision is detected. For example, a TCAS may generate an alert if a nearby aircraft is within a certain range of the aircraft.

Despite the current advances in facilitating a pilot's awareness regarding nearby aircraft, there are still many situations in which a pilot is only made aware of his or her surroundings by looking out the window. However, a pilot's attention may not always be affixed on the windows of the aircraft. For example, a pilot may devote his or her attention to flight planning or problem solving, while the aircraft is in cruise. Applicants have discovered that there may be a need for traffic awareness systems and methods that provide an indication of nearby aircraft to an electronic display, such as a head up display or head down display (e.g., synthetic vision), to facilitate a pilot's situational awareness regarding other aircraft.

SUMMARY

One embodiment of the present disclosure relates to a method of providing air traffic data to a display. The method includes receiving, at processing electronics, data regarding a first aircraft. The method also includes determining the location of the first aircraft relative to the location of a second aircraft. The method further includes determining whether the location of the first aircraft relative to the location of the second aircraft is within a field of view associated with a display. The method also includes providing an indication of the first aircraft to the display based on a determination that the relative location of the first aircraft is within the field of view.

Another embodiment of the present disclosure relates to an air traffic display system. The system includes processing electronics configured to receive data regarding a first aircraft and to determine the location of the first aircraft relative to the location of a second aircraft. The processing electronics are also configured to determine whether the location of the first aircraft relative to the location of the second aircraft is within a field of view associated with a display. The processing electronics are further configured to provide an indication of the first aircraft to the display based on a determination that the relative location of the first aircraft is within the field of view.

A further embodiment of the present disclosure relates to a computer-readable storage medium having instructions stored therein, the instructions being executable by a processor to cause the processor to perform operations. The operations include receiving data regarding a first aircraft and determining the location of the first aircraft relative to the location of a second aircraft. The operations also include determining whether the location of the first aircraft relative to the location of the second aircraft is within a field of view associated with a display. The operations further include providing an indication of the first aircraft to the display based on a determination that the relative location of the first aircraft is within the field of view.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Referring generally to the Figures, traffic awareness systems and methods are disclosed. In various embodiments, a traffic awareness system may be configured to direct a pilot's attention to another nearby aircraft via an indication provided to a display, such as a head-up display (HUD). In general, a HUD is a form of electronic display situated within a pilot's normal field of view from the aircraft. This differs from a traditional head-down display (HDD) which requires the pilot to look away from the windshield to read the HDD. In some cases, a HUD may be partially transparent, allowing the pilot to view objects located outside of the aircraft through the windshield simultaneously with indicia displayed by the HUD. In other words, indicia on the HUD may appear as an overlay to the pilot's view of the aircraft's exterior surroundings. In some embodiments, a HUD may display a synthetic or enhanced view of the aircraft's surroundings. For example, a synthetic vision system may use stored terrain data to create a 3-D representation of the terrain in front of the aircraft on the HUD. In another example, data from an infrared sensor may be used to enhance the view of the aircraft's exterior surroundings through the HUD (e.g., during nighttime flights). In some cases, a HUD system may be configured to switch between display modes, allowing a pilot to selectively activate an enhanced vision or synthetic vision display mode.

According to various embodiments, a processing circuit may analyze data regarding another aircraft and provide an indication of a detected aircraft to a HUD. For example, conformal symbols may be displayed on the HUD to alert the pilot to the relative location of the other aircraft. In one embodiment, an indication of an aircraft detected within the field of view of the HUD (e.g., the pilot's field of view through the HUD) may be displayed. For example, a far-off aircraft in the field of view may otherwise appear as a speck in the sky to the pilot and may not be immediately recognizable by the pilot. However, the HUD may display an indication that the speck is actually an aircraft (e.g., by displaying a box around the other aircraft, by changing the displayed color at the other aircraft's location, etc.). In another embodiment, an indication of an aircraft detected outside of the field of view of the HUD may be displayed on the HUD. For example, an arrow or other symbol may be displayed on the HUD to alert the pilot to the direction in which the other aircraft is located. Thus, the pilot may quickly acquire the location of another aircraft visually.

In an alternate embodiment, a synthetic vision or enhanced display may display an indication that the speck is actually an aircraft (e.g., by displaying a box around the other aircraft, by changing the displayed color at the other aircraft's location, etc.). The synthetic vision display can be a head down display or head up display. In another embodiment, an indication of an aircraft detected outside of the field of view of the synthetic vision display may be displayed on the synthetic vision display. For example, an arrow or other symbol may be displayed on the synthetic vision display to alert the pilot to the direction in which the other aircraft is located.

Figure 1:
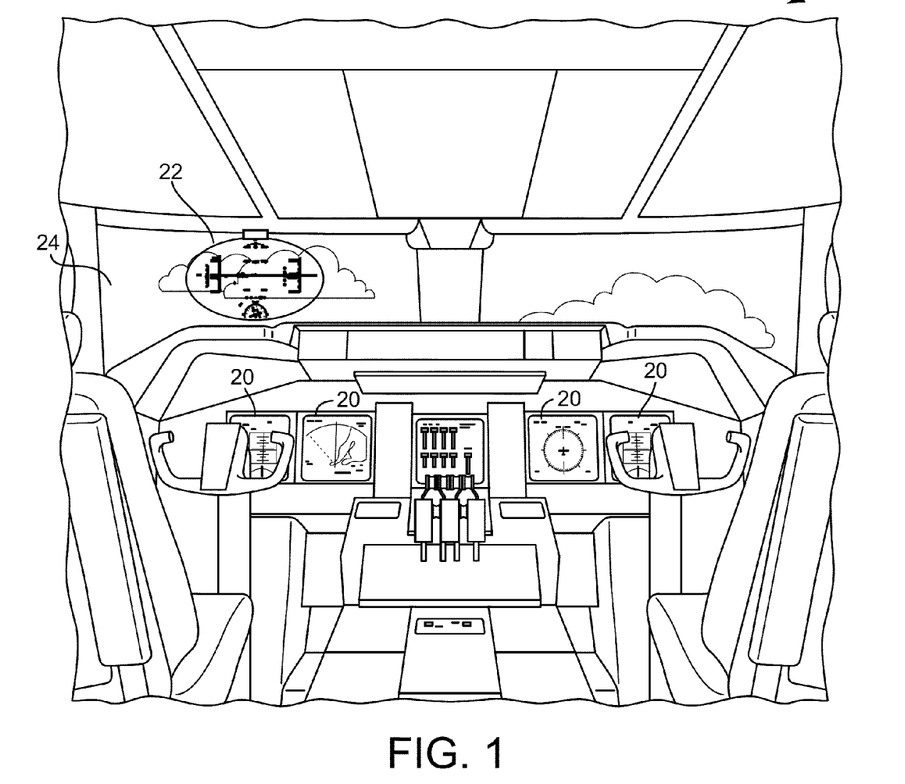
FIG. 1 is an illustration of an aircraft control center, according to an exemplary embodiment.

Referring now to FIG. 1, an illustration of an aircraft control center 10 is shown, according to an exemplary embodiment. Aircraft control center 10 may include various flight displays used by the aircraft's pilot to increase visual range and enhance the pilot's situational awareness. As shown, aircraft control center 10 includes flight displays 20 and a HUD 22. HUD 22 may be located within aircraft control center 10 such that HUD 22 is directly within the pilot's field of vision when looking through windshield 24 of the aircraft. In contrast, flight displays 20 may be located within aircraft control center 10 below the window line, requiring the pilot to look in a downward direction to view flight displays 20 (i.e., flight displays 20 may be HDDs). Flight displays 20 can include an enhanced vision or synthetic vision display system or HUD 22 can be configured for synthetic vision or enhanced vision displays.

In one embodiment, HUD 22 may be partially transparent, allowing the pilot to partially see through HUD 22 and windshield 24. For example, HUD 22 may display data that appears as an overlay to the pilot's field of view through HUD 22. Alternatively, the processing electronics may provide an enhanced view of the aircraft's exterior to HUD 22 (e.g., using data received from an infrared sensor) or a synthetic rendering of the exterior (e.g., as part of a synthetic vision system). In some embodiments, the processing electronics may be configured to allow the pilot to selectively switch between views. For example, a pilot may switch between a partially transparent view and a synthetic vision view on HUD 22. In further embodiments, any of the displayed data described herein with respect to HUD 22 may be provided by flight displays 20 in addition to, or in lieu of, HUD 22.

Processing electronics on board the aircraft may be configured to provide data regarding the state of the aircraft to flight displays 20 and/or HUD 22. For example, data regarding the aircraft's altitude, heading, velocity, etc., may be provided to flight displays 20 and/or HUD 22 by the processing electronics. The processing electronics may be further configured to provide data regarding the external surroundings of the aircraft to flight displays 20 and/or HUD 22. The data can be conformally represented in the real world scene on HUD 22 in one embodiment. In other words, data that appears on HUD 22 may be located precisely in the location of the corresponding feature of the plane's exterior (e.g., a line on HUD 22 may conform to the location of the horizon as the plane moves, etc.).

The processing electronics of the aircraft may receive data regarding the aircraft's surroundings from onboard sensors. For example, the aircraft may be equipped with a radar that performs vertical and horizontal radar sweeps in front of the aircraft. Radar returns may then be processed by the processing electronics to generate and provide display data to flight displays 20 and HUD 22 regarding the external surroundings of the aircraft. For example, flight displays 20 may provide a top-down view, a horizontal view, a vertical profile view, or any other view of weather, terrain, and/or other aircraft detected by processing electronics onboard the aircraft.

The processing electronics of the aircraft may also receive data regarding the aircraft's surroundings communicated from an external source (e.g., a satellite, another aircraft, a ground-based communications station, etc.). In various embodiments, communication devices in the aircraft may be configured to receive and/or transmit data with the external sources. For example, the aircraft may request data regarding the location and bearing of nearby aircraft via the communication devices. The returned data may then be processed by the processing electronics and used to provide information regarding the other aircraft to the pilot via flight displays 20 and HUD 22. The communication electronics in the aircraft may be configured to allow the pilot to converse with others located externally to the aircraft (e.g., a pilot of another aircraft, an air traffic controller, etc.). For example, an air traffic controller on the ground may call out the locations of other nearby aircraft to the pilot via a wireless communications channel.

The processing electronics of the aircraft may be configured to perform various hazard avoidance functions. In one embodiment, the processing electronics may include a terrain awareness and warning system (TAWS) configured to warn the pilot of potentially threatening terrain features (e.g., by displaying a warning on flight displays 20 or HUD 22, by issuing an audible alert via a speaker, etc.). For example, the TAWS system may be configured to give the pilot of the aircraft a "pull up" indication when terrain is detected within an altitude and range of danger to the aircraft. In another embodiment, the processing electronics may include a TCAS configured to provide a warning to the pilot regarding another aircraft within a certain altitude and range of the aircraft.

The onboard processing electronics of the aircraft may be configured to provide an indication of a detected aircraft to HUD 22. In one embodiment, an indication of a detected aircraft within the field of view from HUD 22 may be displayed. For example, a far-off aircraft that may otherwise be unnoticeable to the pilot may be accentuated on HUD 22. In another embodiment, an indication of an off-screen aircraft may be provided to HUD 22. For example, HUD 22 may display a pointer or other icon indicating the relative direction of the other aircraft. In some embodiments, data regarding a detected aircraft (e.g., the range to the other aircraft, the other aircraft's bearing, altitude, etc.) may be compared to one or more threshold values. For example, the processing electronics may adjust the indication of a detected aircraft on HUD 22 based on the distance between the two aircraft. If the aircraft has a TCAS, the processing electronics may switch to the TCAS functionality when a detected aircraft is within a certain range threshold. In other words, the processing electronics may be configured to transition between awareness-related functions (e.g., when another aircraft is a safe distance away) to avoidance-related functions (e.g., when another aircraft enters a defined envelope of space around the aircraft).

Figure 2:
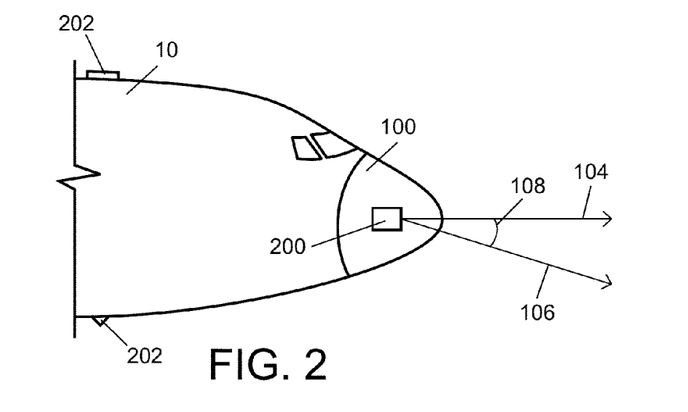
FIG. 2 is an illustration of the nose of an aircraft, according to an exemplary embodiment.

In FIG. 2, the front of an aircraft is shown with aircraft control center 10 and nose 100, according to an exemplary embodiment. Various sensory devices may be located along the exterior of the aircraft. In one embodiment, a radar system 200 (e.g., a weather radar system or other radar system) is generally located within nose 100 of the aircraft or within aircraft control center 10 of the aircraft. Radar system 200 generally works by sweeping a radar beam horizontally and/or vertically along the sky. For example, radar system 200 may conduct a first horizontal sweep 104 directly in front of the aircraft and a second horizontal sweep 106 downward at some tilt angle 108 (e.g., 20 degrees down). Returns from different tilt angles can be electronically merged to form a composite image for display on an electronic display, such as a flight display 20 or HUD 22 in aircraft control center 10. Returns can also be processed to, for example, distinguish between terrain and weather, to determine the height of terrain, or to determine the height of weather.

Communication devices 202 may include devices configured to receive and/or transmit data between the aircraft and one or more external sources. For example, communication devices 202 may include antennas located along the top or bottom of the aircraft to communicate with other airborne or ground-based systems. Communication devices 202 may also include communication electronics coupled to the antennas, such as receivers, transmitters, or transceivers. Communication devices 202 may include separate hardware to support different communication protocols and systems. For example, communication devices 202 may include a TCAS antenna and a separate antenna for receiving location data from a satellite-based positioning system (e.g., GPS, GLONASS, etc.). Communication devices 202 may also include shared hardware configured to communicate via multiple communication protocols.

Similar to radar system 200, communication devices 202 may receive data regarding the aircraft's surroundings. For example, communication devices 202 may receive data regarding another aircraft (e.g., range, altitude, bearing, etc.) from a ground-based communications system, a satellite-based communications system, or from the other aircraft itself. The data may be received by communication devices 202 actively (e.g., in response to a request sent by communication devices 202) or passively (e.g., not in response to a request for the data). Communication devices 202 may also be configured to allow audio or video to be communicated between aircraft control center 10 and an external source. For example, communication devices 202 may transfer audio data between the aircraft's pilot and an air traffic controller or pilot of another aircraft via a radio channel.

Figure 3:
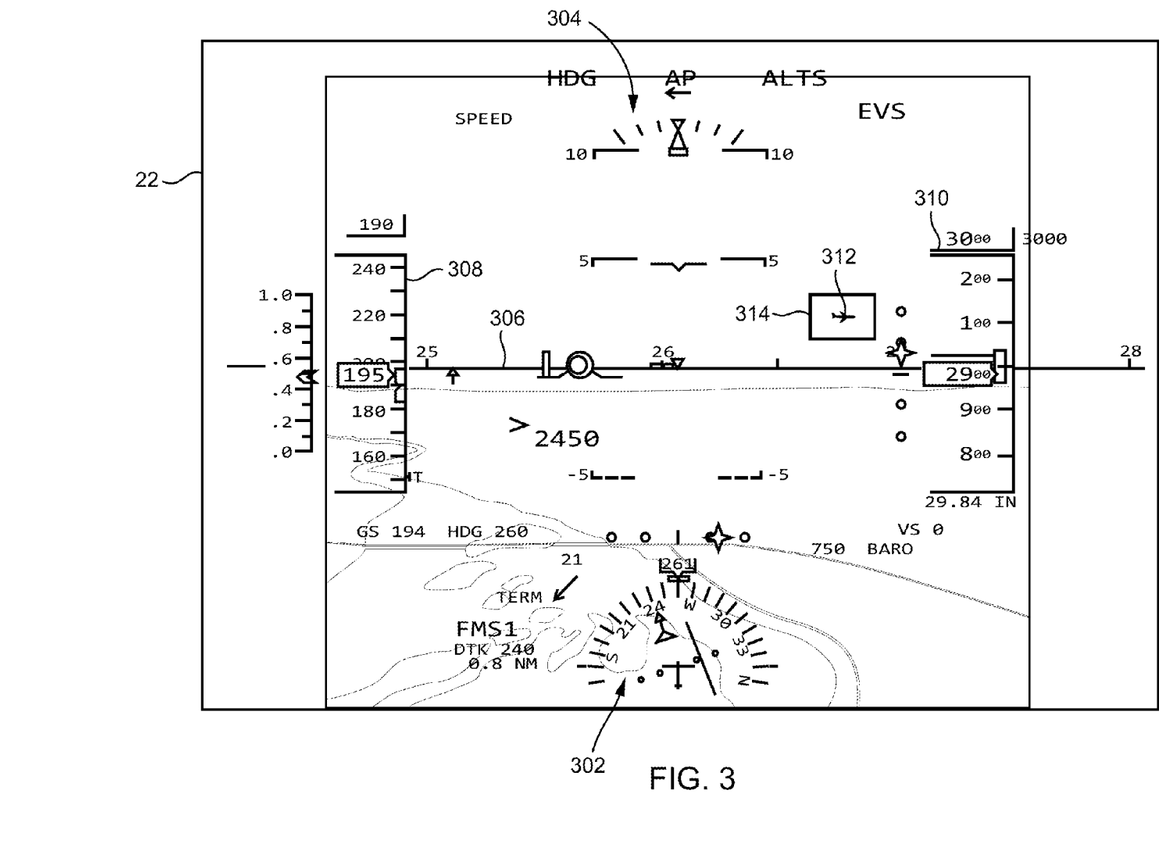
FIG. 3 is an illustration of a heads-up display displaying an indication of detected traffic within the field of view, according to an exemplary embodiment.

Referring now to FIG. 3, an illustration of HUD 22 displaying an indication of detected traffic within the field of view is shown, according to one embodiment. HUD 22 may be partially transparent and configured to provide a graphical overlay to the pilot's field of view while looking through the windshield of the aircraft. For example, external scenery may appear normally to the pilot when looking through HUD 22 and the aircraft's windshield together. In some embodiments, processing electronics coupled to HUD 22 may provide an enhanced vision mode that provides greater contrast among the scenery. For example, the enhanced vision mode may be based on data received from an infrared camera in communication with the processing electronics (e.g., to provide greater contrast to the external scenery when flying at night). In further embodiments, the processing electronics may include a synthetic vision system that creates a 3-dimensional rendering of the external scenery. For example, a synthetic vision system may compare radar returns to a terrain database to create a 3-dimensional rendering of the aircraft's exterior. Such a system is described in U.S. patent application Ser. No. 12/236,464 filed on Sep. 23, 2008 and entitled, "System and Method for Verifying Displayed Terrain Information," the entirety of which is hereby incorporated by reference.

The processing electronics coupled to HUD 22 may provide data regarding the internal and/or external state of the aircraft to HUD 22. For example, the processing electronics may provide a direction indicator 302 to HUD 22. Direction indicator 302 may include data regarding the aircraft's heading, course, or bearing. Directions displayed via direction indicator 302 may be relative to a reference direction, such as magnetic north. For example, the aircraft's current heading may be 256° from magnetic north. Similarly, line 306 and indicator 304 on HUD 22 may indicate the current pitch and roll of the aircraft. Line 306 may also conform to the horizon (e.g., line 306 may overlay the precise location of the horizon). The processing electronics may also provide data regarding the aircraft's speed to HUD 22 via air speed indicator 308 (e.g., a vertical speed, a ground speed, a speed error, etc.) and altitude to HUD 22 via altitude tape 310 (e.g., a measured barometric altitude, a digital radio altitude, etc.). Other exemplary data that may be provided to HUD 22 include wind data (e.g., wind speed and wind direction), flight path data, navigational data (e.g., landmarks, etc.), and other data regarding the aircraft and its surroundings. In some embodiments, the processing electronics may provide warnings or alerts to HUD 22. For example, a TCAS or TAWS may provide an alert to HUD 22 regarding potentially hazardous traffic or terrain.

In the example shown, another aircraft 312 may be located within the field of view associated with HUD 22 and at a distance such that aircraft 312 is not immediately detectable by the human eye. In various embodiments, the processing electronics may receive data regarding aircraft 312 (e.g., onboard sensor data, data communicated from aircraft 312, data communicated from a ground-based communication system, etc.) and process the data to determine the location of aircraft 312 relative to that of the local aircraft. In one embodiment, the processing electronics may use the determined relative location of aircraft 312 to determine whether aircraft 312 is within the field of view associated with HUD 22. If so, the processing electronics may provide an indication 314 to HUD 22 to alert the pilot to the location of aircraft 312.

Indication 314 may be of any number of types of graphical indicators and may be a conformal indication on HUD 22. As shown, indication 314 is a box that encompasses aircraft 312 on HUD 22. However, any type of conformal symbology may be used to indicate aircraft 312 on HUD 22. For example, indication 314 may be any form of standardized symbol or text that alerts the pilot to the location of aircraft 312. In one embodiment, indication 314 may correspond to a certain coloration or shading on HUD 22. For example, if HUD 22 is a monochrome display, indication 314 may correspond to a shaded area on the display or an inverted shaded area (e.g., a black area on the display). Indication 314 may also be conformal in that its location on HUD 22 corresponds to the precise location of aircraft 312. In other words, aircraft 312 may be an actual aircraft visible by the pilot through the windshield and indication 314 conforms to the visible location of aircraft 312, in some embodiments.

In one embodiment, the processing circuit that provides display data to HUD 22 may base indication 314 on the distance to aircraft 312. One or more distance thresholds may be used to adjust indication 314 (e.g., different indications may be provided to HUD 22 based on how close aircraft 312 is). For example, indication 314 may begin flashing when aircraft 312 is within a particular range. If the aircraft is equipped with a TCAS or similar collision avoidance system, the avoidance system may take over when aircraft 312 is within a given envelope of space around the aircraft. For example, TCAS-related alerts or warnings may be provided to HUD 22 if aircraft 312 is within a given range. In one embodiment, indication 314 may be based in part on the heading of aircraft 312. For example, indication 314 may also indicate whether aircraft 312 is oncoming or flying in a different direction.

Figure 4:
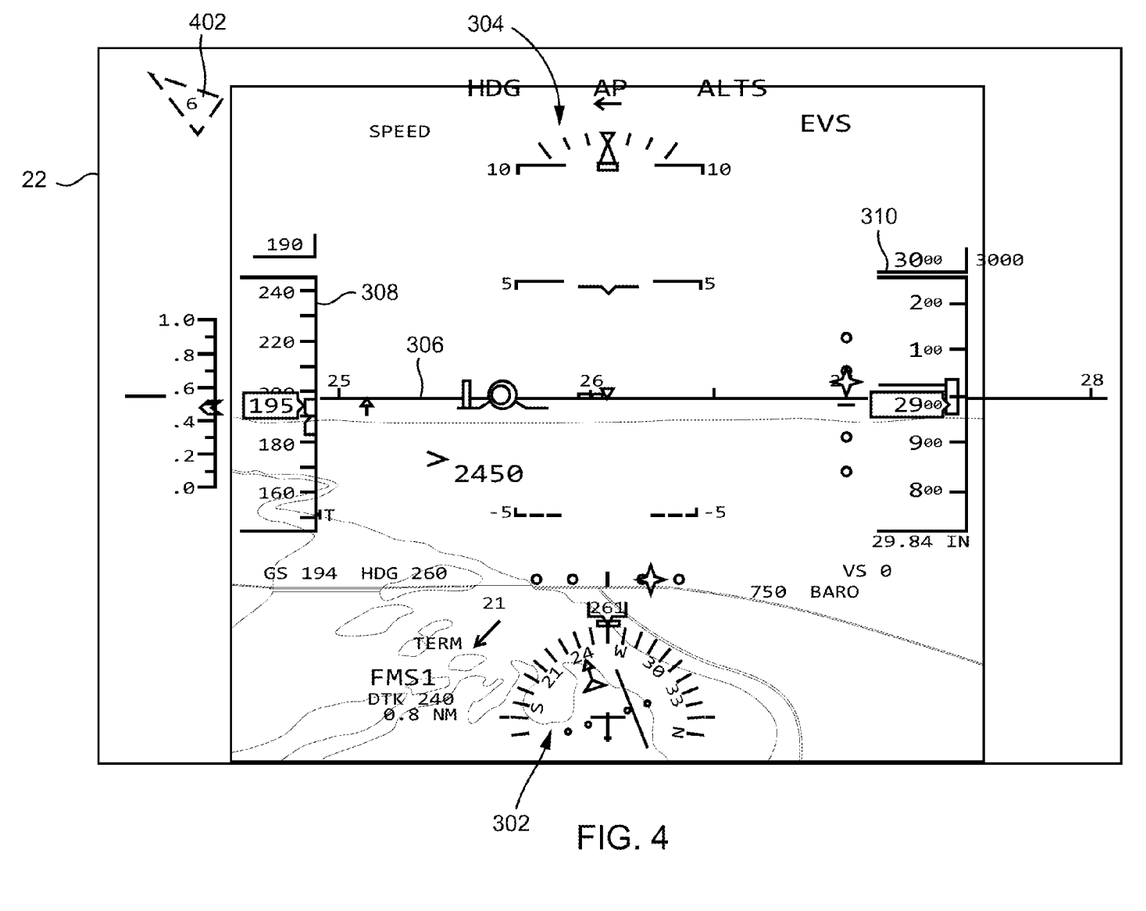
FIG. 4 is an illustration of a heads-up display including an indication of detected traffic outside of a field of view, according to an exemplary embodiment.

Referring now to FIG. 4, an illustration is shown of HUD 22 displaying an indication of traffic detected outside of a field of view, according to one embodiment. As shown, HUD 22 may display any of the data regarding the aircraft's current state or surroundings described with respect to FIG. 3 (e.g., air speed indicator 308, altitude tape 310, etc.). However, in the example shown, assume that aircraft 312 is instead located outside of the field of view associated with HUD 22. In one embodiment, the processing electronics may determine whether another aircraft is outside of the field of view using horizontal and vertical thresholds. For example, the field of view associated with HUD 22 may be limited to 42° from the current heading along a horizontal axis. If another aircraft is located outside of this region, the processing electronics coupled to HUD 22 may determine that aircraft 312 is outside of the field of view associated with HUD 22.

In one embodiment, an indication 402 may be provided to HUD 22 to indicate the location of an aircraft detected outside of the field of view for HUD 22. Indication 402 may be a graphical pointer icon (e.g., an arrow, etc.) that indicates the direction in which the other aircraft is located. For example, indication 402 may signal to the pilot to look to the left and upward from HUD 22 to see the detected aircraft. Indication 402 may be a graphical icon, text, or a combination thereof. Similar to the example shown in FIG. 3, indication 402 may be based in part on the relative distance to the detected aircraft or the direction in which the other aircraft is headed. Threshold values may also be used by the processing electronics to adjust indication 402. For example, a threshold distance may be used by the processing electronics to determine when to hand over functionality to the TCAS. On crossing a threshold value, the processing electronics may adjust indication 402 accordingly (e.g., by changing the icon or text of indication 402, by changing the color of indication 402, by causing indication 402 to flash, etc.). Threshold values may also be used to determine whether indication 402 is even provided to HUD 22, in one embodiment. For example, indication 402 may not be provided to HUD 22, if the other aircraft is located beyond 90° from the aircraft's heading (e.g., beyond the range that the pilot can see from the aircraft's control center).

Figure 5:
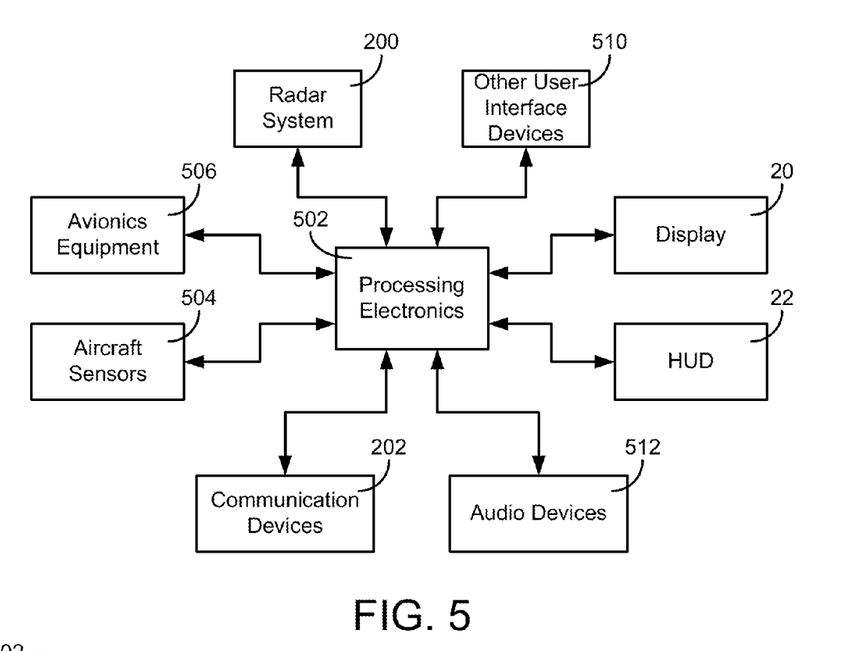
FIG. 5 is a general schematic block diagram of an aircraft's electronic systems, according to an exemplary embodiment.

Referring now to FIG. 5, a general schematic block diagram of an aircraft's electronic systems is shown, according to one embodiment. Processing electronics 502 may include one or more circuits in communication configured to process received data and to output data based on the processed data. Processing electronics 502 may receive data from, or provide data to, any number of the aircraft's electronic devices.

Processing electronics 502 may be in communication with onboard systems configured to generate data regarding the aircraft and its surroundings. In some cases, processing electronics 502 may be in communication with radar system 200 shown in FIG. 2. Radar system 200 may be installed on the aircraft (e.g., in nose 100 of the aircraft or another location) and may be used by the various detection systems of the aircraft to detect hazardous conditions. For example, radar system 200 may be used by a weather detection system to detect the presence of weather, a windshear condition, or by other radar detection systems of the aircraft. Radar system 200 may include a radar antenna connected to circuitry configured to control the direction in which the radar antenna is pointing. Radar system 200 may also include circuitry to transmit a radar beam and to receive radar returns.

Processing electronics 502 may also be in communication with communication devices 202 shown in FIG. 2. Communication devices 202 may be configured to receive data regarding another aircraft from an external source, such as a ground-based communications system (e.g., air traffic control, etc.), a satellite-based communications system, or from the other aircraft itself. In one embodiment, processing electronics 502 may also transmit data via communication devices 202, such as a request for data regarding nearby aircraft. Processing electronics 502 may also communicate data regarding the aircraft (e.g., the aircraft's current state, flight plan, etc.) to an external system via communication devices 202. Communications devices 202 may include electronics configured to communicate audio and/or video between the aircraft and an external system. In one embodiment, communications devices 202 may include a TCAS receiver or transceiver configured to receive data from other aircraft regarding their range, altitude, and bearing. Data from the TCAS receiver can be used to compute whether other aircraft are in the field of view of HUD 22 in one embodiment.

Processing electronics 502 are shown in communication with aircraft sensors 504. In general, sensors 504 may be any number of sensors that measure aircraft parameters related to the state of the aircraft. For example, sensors 504 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), a camera (e.g., an infrared camera, a microwave camera, etc.), or any other aircraft-mounted sensors that may be used to provide data to processing electronics 502. It should be appreciated that sensors 504 (or any other component shown connected to processing electronics 502) may be indirectly or directly connected to the processing electronics 502. For example, processing electronics 502 may receive a temperature reading directly from a temperature sensor and a throttle position indirectly from a position sensor via an engine controller.

Processing electronics 502 are further shown in communication with avionics equipment 506. In general, avionics equipment 506 may include other electronic control systems in the aircraft. For example, avionics equipment 506 may include a flight management system, a navigation system, a backup navigation system, or another aircraft system configured to provide inputs to processing electronics 502. For example, avionics equipment 506 may include the landing gear system of the aircraft and provide information such as whether or not the landing gear is deployed, a weight on wheels determination, or other parameters to processing electronics 502. In another example, avionics equipment 506 may provide controls inputs, such as a desired throttle or power level to processing electronics 502.

Processing electronics 502 are additionally shown in communication with display 20, HUD 22, audio devices 512, and other user interface devices 510 (e.g., an electronic device that receives input from a user or conveys information to a user). For example, processing electronics 502 may provide information about detected weather or other radar-related information to display 20. In some cases, processing electronics 502 may also receive input from display 20, HUD 22, audio devices 512, or other user interface devices 510. For example, processing electronics 502 may receive a request for a different radar view or an updated trajectory via display 20 or a dial in other user interface devices 510.

Processing electronics 502 may receive data regarding another aircraft from communication devices 202, aircraft sensors 504, and/or from radar system 200. For example, processing electronics 502 may receive TCAS-related data from another aircraft via communication devices 202. In another example, processing electronics 502 may receive radar return data from radar system 200 regarding another aircraft. In some embodiments, processing electronics 502 may use the received data to determine the relative location of the other aircraft (e.g., a direction relative to the heading of the local aircraft, a range relative to the location of the local aircraft, etc.). Based on the location of the other aircraft, processing electronics 502 may provide display data to display 20 or HUD 22 that includes an indication of the other aircraft. In further embodiments, processing electronics 502 may be configured to compare the relative location of the other aircraft to one or more threshold values. For example, processing electronics 502 may determine whether the other aircraft is within a field of view associated with HUD 22, is outside of a pilot's total field of view through the aircraft's windows, or is within a certain range. In some case, processing electronics 502 may include a hazard detection system, such as a TCAS, that generates alerts or warnings based on the relative location of the other aircraft. For example, processing electronics 502 may provide an alert to audio devices 514, display 20, or HUD 22 if the other aircraft is within a particular range envelope around the aircraft.

Figure 6:
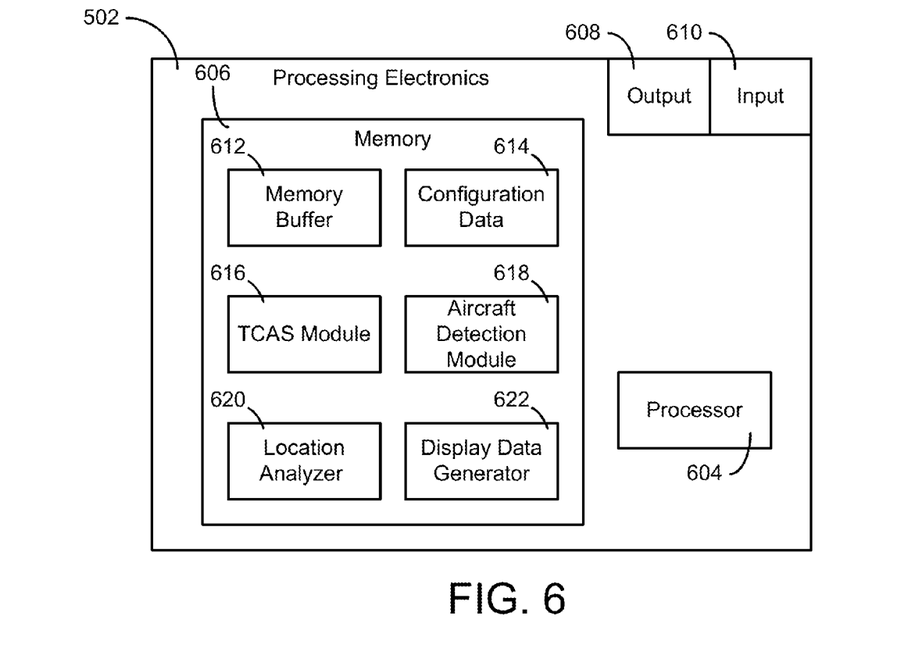
FIG. 6 is a general schematic block diagram of the processing electronics of FIG. 5, according to an exemplary embodiment.

Referring now to FIG. 6, a detailed block diagram of processing electronics 502 of FIG. 5 is shown, according to an exemplary embodiment. Processing electronics 502 includes a memory 606 and processor 604. Processor 604 may be, or may include, one or more microprocessors, an application specific integrated circuit (ASIC), a circuit containing one or more processing components, a group of distributed processing components, circuitry for supporting a microprocessor, or other hardware configured for processing. According to an exemplary embodiment, processor 604 is configured to execute computer code stored in memory 606 to complete and facilitate the activities described herein. Memory 606 can be any volatile or non-volatile computer-readable storage medium capable of storing data or computer code relating to the activities described herein. For example, memory 606 is shown to include modules 616-622 which are computer code modules (e.g., executable code, object code, source code, script code, machine code, etc.) configured for execution by processor 604. When executed by processor 604, processing electronics 502 is configured to complete the activities described herein.

Processing electronics includes hardware circuitry for supporting the execution of the computer code of modules 616-622. For example, processing electronics 502 includes hardware interfaces (e.g., output 608) for communicating control signals (e.g., analog or digital signals) from processing electronics 502 to avionics equipment 506 and to provide signals to other devices such as display 20, HUD 22, audio devices 512, and other user interface devices 510. Processing electronics 502 may also include an input 610 for receiving, for example, data from user interface devices (e.g., display 20, etc.) or other systems (e.g., aircraft sensors 504, avionics equipment 506, communication devices 202, etc.).

Memory 606 includes a memory buffer 612 for receiving and storing radar return data from radar system 200, sensor data from aircraft sensors 504, operational data from avionics equipment 506, and/or data received via communications devices 202. For example, memory buffer 612 may include data regarding the aircraft's altitude, speed, heading, bearing, and other characteristics. Memory buffer 612 may also include data regarding the aircraft's external conditions, such as detected weather, wind data, terrain data, etc. In some embodiments, the data stored in memory buffer 612 may include data regarding another aircraft. For example, memory buffer 612 may include data regarding the other aircraft's location (e.g., data received or calculated regarding the other aircraft's latitude, longitude, altitude, etc.).

Memory 606 further includes configuration data 614. Configuration data 614 may include various parameters used to control which display data is provided to HUD 22 and to the other user interface devices of the aircraft. In one embodiment, configuration data 614 includes a parameter that controls whether HUD 22 is in a partially transparent state, an enhanced vision state, or a synthetic vision state. Configuration data 614 may also include one or more parameters that control when data regarding other aircraft is provided to HUD 22 or the other user interface devices. For example, a parameter in configuration data 614 may control whether an indication of another aircraft is provided outside of a given range (e.g., a pilot may specify a range at which he or she wishes to see an indication of another aircraft).

Memory 606 includes aircraft detection module 618 configured to detect the presence of another aircraft using data stored in memory buffer 612. In one embodiment, aircraft detection module 618 may analyze radar returns stored in memory buffer 612 to detect the presence of another aircraft. In another embodiment, aircraft detection module 618 may detect the presence of another aircraft using data stored in memory buffer 612 and communicated to processing electronics 502 from a ground-based communications system, a satellite-based communications system, or from the other aircraft itself. In response to detecting the presence of another aircraft, aircraft detection module 618 may notify TCAS module 616 or range analyzer 620 of the detected aircraft.

Location analyzer 620 is configured to determine the location of an aircraft detected by aircraft detection module 618.

Location analyzer 620 may, for example, determine the range, altitude, bearing, or similar location information regarding the other aircraft using the data stored in memory buffer 612. In one embodiment, the determined location data may be relative to that of the local aircraft. For example, the range to the other aircraft may correspond to the distance between the two aircraft (e.g., location analyzer 620 may compare the location coordinates, such as a latitude and longitude of the two aircraft, to determine the range).

Location analyzer 620 may compare the location data for the other aircraft to one or more threshold values. In one embodiment, location analyzer 620 may compare the bearing of the other aircraft to threshold directions corresponding to boundaries of the pilot's field of view through HUD 22. For example, location analyzer 620 may determine that the bearing of the other aircraft is such that it is within the field of view associated with HUD 22. In another example, location analyzer 620 may determine that the bearing of the other aircraft is such that it is outside of the field of view associated with HUD 22, but is still within the field of view available to the pilot through the windshield of the aircraft. In some embodiments, location analyzer 620 may also compare the range to the other aircraft and/or the altitude of the other aircraft to one or more threshold values. Location analyzer 620 may provide the location data for the other aircraft to TCAS module 616 and display data generator 622. Location analyzer 620 may also provide data to TCAS module 616 and display data generator 622 that is indicative of the result of a comparison between the location data and the one or more threshold values.

In alternative embodiments, aircraft detection module 618 and location analyzer 620 may be stored and executed by processing electronics external to the aircraft. For example, aircraft detection module 618 and location analyzer 620 may be part of a ground-based system (e.g., air traffic control, etc.) or the processing electronics of another aircraft. In such cases, processing electronics 502 may receive results from the external data source via communication devices 202 and input 610. For example, a ground-based system may detect the presence of another aircraft and communicate the altitude, range, and bearing to processing electronics 502. In one embodiment, processing electronics 502 is configured to request data regarding other aircraft from an external data source. For example, processing electronics 502 may send a data request via output 608 and communication devices 202 to another aircraft or a ground-based system. In another embodiment, processing electronics 502 may passively receive data regarding another aircraft from an external data source (i.e., without processing electronics 502 first requesting the data).

Memory 606 may optionally include TCAS module 616. TCAS module 616 is configured to generate alerts and warnings when another aircraft is detected within a given envelope of space around the in-flight aircraft. A envelope may be, for example, a 3-dimensional region of space around the local aircraft inside of which another aircraft may present a potential hazard. In one embodiment, TCAS module 616 may receive an indication that another aircraft is within the envelope from location analyzer 620. TCAS module 616 may use the received data and data regarding the local aircraft to determine whether an alert or warning is to be issued. For example, TCAS module 616 may use data regarding the local aircraft's speed, altitude, and heading to estimate a potential time until impact with the other aircraft. In a first envelope, TCAS module 616 may issue a traffic advisory by providing an alert to display 20, HUD 22, audio devices 512, or other user interface devices 510. For example, TCAS module 616 may generate a traffic advisory alert if another aircraft is between 1 m-30 s of a potential impact. In a second envelope, TCAS module 616 may generate a resolution advisory warning if the other aircraft is between 30 s-0 s of a potential impact. For example, TCAS module 616 may change the traffic advisory alert into a resolution advisory warning, to instruct the pilot to change course to avoid a mid-air collision.

Memory 606 also includes display data generator 622 configured to provide data to HUD 22 and display 20. Display data generator 622 may determine which data is to be displayed based in part on configuration data 614. For example, a pilot may specify a parameter in configuration data 614 that causes display data generator 622 to enter into an enhanced vision mode. Display data generator 622 may provide any form of data to a display regarding the state of the local aircraft (e.g., the aircraft's speed, altitude, heading, etc.) and/or the state of the aircraft's exterior surroundings (e.g., wind data, weather data, terrain data, etc.). Display data generator 622 may be configured to generate and provide enhanced vision data (e.g., data obtained from an infrared camera) to a display. Display data generator 622 may also be configured to include synthetic vision functionalities and to provide a rendering of the aircraft's exterior to a display.

In various embodiments, display data generator 622 may receive an indication of a detected aircraft from aircraft detection module 618 and data regarding the other aircraft from location analyzer 620. Based on configuration data 614 and the location of the other aircraft from location analyzer 620, display data generator 622 may provide an indication of the other aircraft to a display. For example, display data generator 622 may provide an indication of the detected aircraft to HUD 22, to make the pilot aware of the location of the other aircraft.

Display data generator 622 may provide different indications of a detected aircraft to HUD 22 or display 20, based on threshold comparisons made by location analyzer 620. In one embodiment, display data generator 622 may provide a first indication to HUD 22 if the detected aircraft is within the field of view associated with HUD 22. For example, display data generator 622 may generate a box or other indication on HUD 22 that alerts a pilot to the location of the other aircraft. In another embodiment, display data generator 622 may provide a second indication to HUD 22 if the detected aircraft is outside of the field of view associated with HUD 22. For example, display data generator 622 may provide a pointer icon to HUD 22 to alert a pilot to the off-screen aircraft.

In some embodiments, display data generator 622 may adjust an indication of a detected aircraft provided to a display, based on the range to the aircraft. For example, display data generator 622 may cause an indication of a detected aircraft to change when the aircraft is within a certain range threshold. In cases in which memory 606 includes TCAS module 616, display data generator 622 may hand off control over the displays to TCAS module 616, if the other aircraft is within a particular envelope around the aircraft. For example, display data generator 622 may provide an indication of a detected aircraft to HUD 22 so long as the other aircraft is outside of a set envelope around the aircraft. If the other aircraft enters the envelope, TCAS module 616 may take control over HUD 22 or display 20, to provide warnings and alerts to the pilot. Therefore, in some embodiments, display data generator 622 may generally make the pilot aware of the other aircraft, while TCAS module 616 may alert the pilot to a potential collision with the other aircraft.

Figure 7:
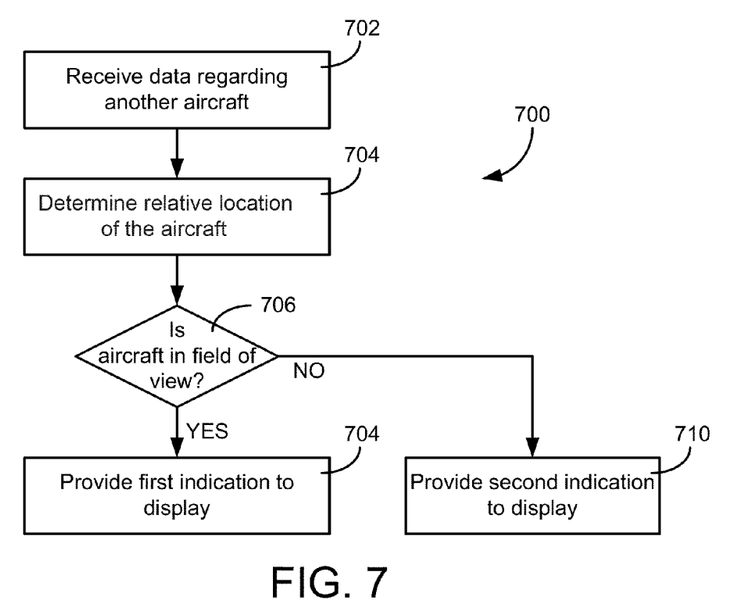
FIG. 7 is a flow chart of a process for providing indicia to an electronic display regarding nearby air traffic, according to an exemplary embodiment.

Referring now to FIG. 7, a flow chart of a process 700 for providing indicia to an electronic display regarding nearby air traffic is shown, according to an exemplary embodiment. Process 700 may be implemented by processing electronics or a set of distributed processing electronics in communication with one another. The processing electronics may store machine instructions that, when executed by one or more processors, cause the processing electronics to perform process 700.

Process 700 is shown to include receiving data regarding another aircraft (step 702). The data regarding another aircraft may be received from one or more sensors local to the aircraft or from an external source. Local sensors may include, but are not limited to, infrared and radar systems of the aircraft. External sources may include, but are not limited to, other aircraft, ground-based systems, and satellite-based systems. For example, another aircraft may report its location via communication hardware on board the two aircraft. In another example, data regarding another aircraft may be received from an air traffic control service.

Process 700 also includes determining the relative location of the other aircraft (step 704). The received data may be analyzed to determine location data relative to the local aircraft. In one embodiment, the altitude, bearing, and range of the other aircraft may be determined relative to the local aircraft. For example, the determined range may indicate the distance between the two aircraft. In another example, a bearing of the other aircraft may be compared to the heading of the local aircraft, to determine an angle between the two values (e.g., the other aircraft is 20° to the left of the aircraft's current heading).

Process 700 further includes determining whether the other aircraft is within a field of view (step 706). The field of view may correspond to the pilot's field of view from the control center of the aircraft. In one embodiment, the field of view may correspond to the pilot's field of view via a HUD. For example, a HUD may have an associated field of view having boundaries at 20° in the horizontal and vertical directions from the aircraft's heading.

Process 700 includes providing a first indication of a detected aircraft to a display (step 708). The display may be a HUD or HDD, according to various embodiments. If the detected aircraft is determined to be within a field of view in step 706, a first indication may be generated and provided to the display. The indication may be, for example, an icon or symbol, text, graphical effect, coloration, or combinations thereof. In one embodiment, an outline of the detected aircraft may be provided to the display (e.g., a square, rectangle, etc., surrounding the other aircraft on the display). For example, a partially transparent HUD may include a box around the other aircraft visible through the HUD. In another example, a synthetic representation of the other aircraft may include an icon or coloration to alert the pilot to the presence of the other aircraft.

Process 700 further includes providing a second indication of a detected aircraft to a display (step 710). The display may be the same or different HUD or HDD as in step 708. If the detected aircraft is determined to be outside of the field of view in step 706, a second indication may be generated and provided to the display, to alert the pilot to the other aircraft this is outside of the field of view. The second indication may be, for example, a pointer icon or text that indicates the relative location of the second aircraft. For example, display data may be provided to a HUD that causes the HUD to display a pointer to a detected aircraft that is outside of the field of view associated with the HUD.

In some embodiments, process 700 may be repeated iteratively, to provide a display with data that tracks the relative location of the other aircraft. For example, a detected aircraft that is within a field of view associated with a HUD may appear within a displayed box on the HUD, to alert the pilot to the location of the other aircraft. However, if the pilot changes the heading of the aircraft, the other aircraft may exit the field of view. In such a case, another indication may be provided to the HUD, to indicate the off-screen location of the other aircraft. For example, the HUD may display a pointer icon that indicates that the pilot should look to his or her left, to see the other aircraft.

Figure 8:
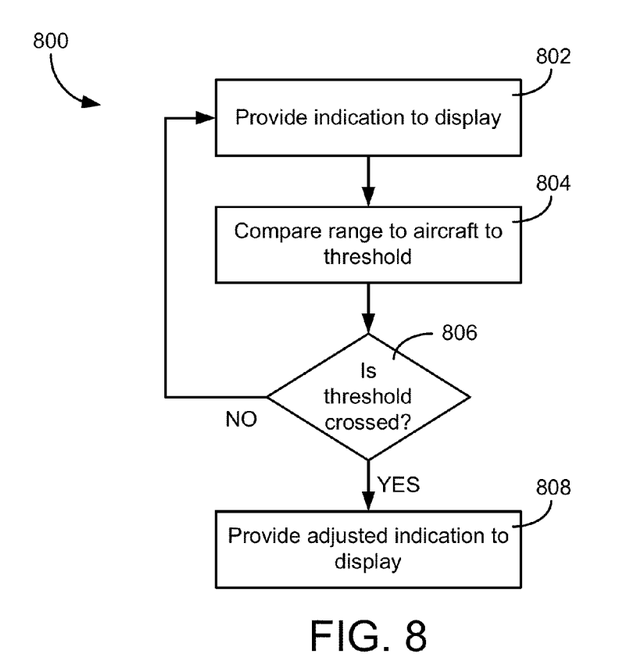
FIG. 8 is a flow chart of a process for adjusting air traffic indicia on an electronic display is shown, according to an exemplary embodiment.

Referring now to FIG. 8, a flow chart of a process 800 for adjusting air traffic indicia on an electronic display is shown, according to an exemplary embodiment. Similar to process 700, process 800 may be implemented by processing electronics that execute stored machine instructions. The processing electronics may be centralized (e.g., within an aircraft) or may be distributed, allowing certain steps of processes 700-800 to be performed by processing electronics external to the aircraft.

Process 800 includes providing an indication of a detected aircraft to a display (step 802). The display may be a HUD or HDD, in various embodiments. In one embodiment, the indication may be provided in conjunction with process 700. For example, the indication may indicate that the other aircraft is inside or outside of a particular field of view. The indication may be configured to draw a pilot's attention to the other aircraft and/or include data regarding the other aircraft. For example, the indication may also include data regarding the other aircraft's altitude, speed, bearing, course, etc.

Process 800 includes comparing a range to the detected aircraft to a threshold value (step 804). Any number of range thresholds may be used. For example, threshold values may correspond to n-number of nautical miles between the local aircraft and the other aircraft. In one embodiment, a threshold value may also correspond to an envelope used in a collision avoidance system (e.g., a TCAS). The indication provided to the display may be based in part on the comparison with the threshold range. For example, an indication may be colored green, if the other aircraft is outside of a threshold range.

Process 800 also includes a determining whether a range threshold value has been crossed (step 806). Based on the comparison between the range to the other aircraft and the threshold value in step 804, the provided indication may be adjusted (step 808). For example, if the other aircraft's location crosses a particular range threshold, it's corresponding indication on the display may be adjusted to reflect this (e.g., by changing the indication from green to yellow, by causing the indication to flash, etc.). In one embodiment, data regarding the other aircraft may be provided based on whether the other aircraft is within a particular range. For example, an aircraft that is outside of the threshold range may have only a displayed icon. However, if the other aircraft crosses a particular range threshold, data regarding the other aircraft's altitude, range, or bearing may also be provided to the display. If it is determined in step 806 that a range threshold has not been crossed, the indication being provided may instead remain unchanged and process 800 may return to step 802.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of providing air traffic data to a display on a base aircraft, the method comprising:
   receiving, at processing electronics, data regarding a first aircraft via a communication device on the base aircraft, the data being indicative of a location of the first aircraft;
   receiving a location of the base aircraft from a location source;
   determining the location of the first aircraft relative to the location of the base aircraft;
   determining whether the location of the first aircraft relative to the location of the base aircraft is within a field of view associated with a display;
   providing an indication of the first aircraft to the display based on a determination that the relative location of the first aircraft is within the field of view; and
   comparing the relative location of the first aircraft to a range threshold value; and
   adjusting the indication based on a determination that a range between the first aircraft and the base aircraft has crossed the range threshold value.

2. The method of claim 1, wherein the display is a head up display.

3. The method of claim 2, wherein the first aircraft is visible through the head-up display and the indication comprises an icon associated with the location of the first aircraft on the display.

4. The method of claim 1, further comprising:
   providing a second indication of the first aircraft to the display based on a determination that the relative location is outside of the field of view associated with the display.

5. The method of claim 4, wherein the second indication comprises a pointer icon configured to point towards the location of the first aircraft.

6. The method of claim 1, wherein the location source is a GPS receiver or an aircraft sensor.

7. The method of claim 2, further comprising:
   providing data to the head-up display indicative of at least one of: the altitude of the first aircraft, the range to the first aircraft, or the bearing of the first aircraft.

8. An air traffic display system, the system comprising processing electronics configured to:
   receive data regarding a first aircraft via a communication device on the base aircraft, the data being indicative of a location of the first aircraft;
   receiving a location of a base aircraft from a location source;
   determine the location of the first aircraft relative to the location of the base aircraft;
   determine whether the location of the first aircraft relative to the location of the base aircraft is within a field of view associated with a display; and
   provide an indication of the first aircraft to the display based on a determination that the relative location of the first aircraft is within the field of view, wherein the processing electronics are configured to compare the relative location of the first aircraft to a range threshold value and to adjust the indication based on a determination that a range between the first aircraft and the base aircraft has crossed the range threshold value.

9. The system of claim 8, wherein the display is a head-up display.

10. The system of claim 9, wherein the first aircraft is visible through the head-up display and the indication comprises an icon associated with the location of the first aircraft on the display.

11. The system of claim 8 wherein the processing electronics are further configured to provide a second indication of the first aircraft to the display based on a determination that the relative location is outside of the field of view associated with the display.

12. The system of claim 11, wherein the second indication comprises a pointer icon configured to point towards the location of the first aircraft.

13. The system of claim 8, wherein the location source is a GPS receiver or an aircraft sensor.

14. The system of claim 9, wherein the processing electronics are configured to provide data to the head-up display indicative of at least one of: the altitude of the first aircraft, the range to the first aircraft, or the bearing of the first aircraft.

15. A computer-readable storage medium having instructions stored therein, the instructions being executable by an electronic processor to cause the processor to perform operations on a base aircraft, the operations comprising:

electronically receiving data regarding a first aircraft at the electronic processor, the data being received via a communication device on the base aircraft, the data being indicative of a location of the first aircraft;

electronically receiving a location of the base aircraft from a location source;

electronically determining the location of the first aircraft relative to the location of the base aircraft;

electronically determining whether the location of the first aircraft relative to the location of the base aircraft is within a field of view associated with a display; and causing an indication of the first aircraft to be provided on the display based on a determination that the relative location of the first aircraft is within the field of view;

comparing the relative location of the first aircraft to a range threshold value; and causing the indication to be adjusted based on a determination that a range between the first aircraft and the base aircraft has crossed the range threshold value.

16. The computer-readable storage medium of claim 15, wherein the display is a head-up display.

17. The computer-readable storage medium of claim 16, wherein the first aircraft is visible through the head-up display and the indication comprises an icon associated with the location of the first aircraft on the display.

18. The computer-readable storage medium of claim 15, wherein the operations comprise:

causing a second indication of the first aircraft to the display based on a determination that the relative location is outside of the field of view associated with the display.

19. The computer-readable storage medium of claim 18, wherein the second indication comprises a pointer icon configured to point towards the location of the first aircraft.

20. The computer-readable storage medium of claim 15, wherein the location source is a GPS receiver or an aircraft sensor.

* * * * *